(12) United States Patent
Weisbart et al.

(10) Patent No.: US 10,057,001 B2
(45) Date of Patent: *Aug. 21, 2018

(54) ADD-ON SYSTEM AND METHODS FOR SPATIAL SUPPRESSION OF INTERFERENCE IN WIRELESS COMMUNICATION NETWORKS

(71) Applicant: ELTA SYSTEMS LTD., Ashdod (IL)

(72) Inventors: Shmuel Weisbart, Tel Aviv (IL); Joseph Tabrikian, Tel Aviv (IL); Dov Wulich, Metar (IL)

(73) Assignee: ELTA SYSTEMS LTD., Ashdod (IL)

( * ) Notice: Subject to any disclaimer, the term of this patent is extended or adjusted under 35 U.S.C. 154(b) by 0 days.

This patent is subject to a terminal disclaimer.

(21) Appl. No.: 15/484,655

(22) Filed: Apr. 11, 2017

(65) Prior Publication Data

US 2017/0244508 A1    Aug. 24, 2017

Related U.S. Application Data

(62) Division of application No. 14/378,135, filed as application No. PCT/IL2013/050128 on Feb. 12, 2013, now Pat. No. 9,654,988.

(30) Foreign Application Priority Data

Feb. 12, 2012   (IL) .......................................... 218047

(51) Int. Cl.
   *H04J 11/00*    (2006.01)
   *H04W 24/02*    (2009.01)
   *H04B 7/08*     (2006.01)

(52) U.S. Cl.
   CPC ........ *H04J 11/0046* (2013.01); *H04B 7/0848* (2013.01); *H04W 24/02* (2013.01)

(58) Field of Classification Search
   CPC .. H04B 7/0413; H04B 7/0617; H04B 7/0842; H04B 2201/709709; H04B 7/086;
   (Continued)

(56) References Cited

U.S. PATENT DOCUMENTS 9,654,988 B2 *   5/2017   Weisbart ............... H04W 24/02
2001/0003164 A1  6/2001   Murakami
(Continued)

FOREIGN PATENT DOCUMENTS

CN    1836372 A    9/2006
CN    1885848 A   12/2006
(Continued)

OTHER PUBLICATIONS

Proakis "Digital Communications", Fourth edition, McGraw Hill, 1-926 (2001).
(Continued)

*Primary Examiner* — Curtis Odom
(74) *Attorney, Agent, or Firm* — Browdy and Neimark, PLLC

(57) ABSTRACT

A system for cancelling interference in a wireless network, the system comprising apparatus for computing and outputting at least N weighting vectors; and apparatus for cancelling interference from antennae outputs received by the system using the weighting vectors respectively by converting the weighting vectors into FIR filter coefficients and applying FIR filters corresponding to the FIR filter coefficients to derivatives of antennae outputs received by the system. The apparatus for computing and outputting weighting vectors may be operative by estimating a spatial signature while distinguishing interference spatial signature from desired signal spatial signature although both are received simultaneously.

14 Claims, 8 Drawing Sheets

(58) Field of Classification Search
CPC .. H04B 7/0634; H04W 24/02; H04W 72/082; H04W 52/243; H04L 25/0328; H04J 11/0046
See application file for complete search history.

(56) References Cited

U.S. PATENT DOCUMENTS

| | | | |
|---|---|---|---|
| 2003/0020372 | A1 | 1/2003 | Baker et al. |
| 2005/0047384 | A1* | 3/2005 | Wax .................. H04W 72/046 370/338 |
| 2006/0294170 | A1 | 12/2006 | Matsuoka et al. |
| 2007/0072551 | A1 | 3/2007 | Pajukoski et al. |
| 2007/0185693 | A1 | 8/2007 | Nishiyama |
| 2011/0012787 | A1 | 1/2011 | Na et al. |
| 2014/0226735 | A1 | 8/2014 | Zang et al. |

FOREIGN PATENT DOCUMENTS

| | | |
|---|---|---|
| WO | 2004012359 A2 | 2/2004 |
| WO | 2010066287 A1 | 6/2010 |
| WO | 2011107596 A1 | 9/2011 |
| WO | 2011158230 A2 | 12/2011 |

OTHER PUBLICATIONS

Marvin K. Simon et al "Digital Communication over Fading Channels", Wiley, 1-544 (2000).

Khan "LTE for 4G Mobile Broadband: Air Interface Technologies and Performance", Cambridge University Press,1-11 (2009).

Stefania Sesia et al "LTE—The UMTS Long Term Evolution", Wiley, 1-752 (2009).

LTE standard "LTE Evolved Universal Terrestrial Radio Access (E-UTRA); Long Term Evolutin (LTE) Physical layer: General description"—3GPP TS 36.201 V8.3.0 (Mar. 2009).

LTE standard—"LTE; Evolved Universal Terrestrial Radio Access (E-UTRA); Physical channels and modulation" 3GPP TS 36.211 V8.9.0 (Dec. 2009).

LTE standard—"LTE; Evolved Universal Terrestrial Radio Access (E-ULTRA); Multiplexing and channel coding" 3GPP TS 36.212 V8.8.0 (Dec. 2009).

Ashid F et al : "Diversity reception for OFDM systems using antenna arrays", International Symposium on Wireless Pervasive Computing, p. 1-6 (2005).

* cited by examiner

ADD-ON SYSTEM AND METHODS FOR SPATIAL SUPPRESSION OF INTERFERENCE IN WIRELESS COMMUNICATION NETWORKS

REFERENCE TO CO-PENDING APPLICATIONS

This case is a divisional application of application Ser. No. 14/378,135 filed Aug. 12, 2014.

PCT application No. IL2011/000468 "System and Methods for Null Steering in a Multicarrier System", filed Jun. 13, 2011, is co-pending.

Israel Application No. 206417 entitled "System and Methods for Null Steering in a Multicarrier System", filed Jun. 17, 2010, is co-pending.

FIELD OF THE INVENTION

The present invention relates generally to wireless communication networks and more particularly to interference in such networks.

BACKGROUND OF THE INVENTION

Conventional technology pertaining to certain embodiments of the present invention is described in the following publications inter alia:
[1] J. G. Proakis, Digital Communications, Fourth edition, McGraw Hill, 2001.
[2] M. K. Simon and M. S. Alouini, Digital Communication over Fading Channels, Wiley, 2000.
[3] F. Khan, LTE for 4G Mobile Broadband, Cambridge, 2009.
[4] S. Sesia, I. Toufik and M. Baker, LTE—The UMTS Long Term Evolution, Wiley, 2009.
[5] LTE standard—3GPP TS 36.201 V8.3.0 (2009-03)
[6] LTE standard—3GPP TS 36.211 V8.9.0 (2009-12)
[7] LTE standard—3GPP TS 36.212 V8.8.0 (2009-12)

The disclosures of all publications and patent documents mentioned in the specification, and of the publications and patent documents cited therein directly or indirectly, are hereby incorporated by reference.

SUMMARY OF THE INVENTION

Certain embodiments of the invention seek to provide an antenna array system operative to increase or maximize the signal to interferers and noise ratio (SINR). The antenna array may be a "piggy back" type, e.g., the antenna array may be autonomous, and does not cooperate with the base station (BS). The only connection between the antenna array and base station may be that the output of antenna array system may be connected to the antenna input of the BS.

Certain embodiments of the invention seek to provide a system for spatial suppression of interferences e.g. in LTE-Type cellular communication networks.

Certain embodiments of the invention seek to provide a system in which interference cancellation is performed and causes a delay to transmissions which is small enough to be insignificant in cellular applications e.g. in that the delay is small enough such that the base station does not erroneously conclude that the mobile stations are further away than they are in fact.

Certain embodiments of the invention seek to provide a system connected to a base station operative to mitigate interference and having no control interface with the base station other than a radio connector replacing the base station antenna as an input device to the base station.

Certain embodiments of the invention seek to provide a system connected to a base station operative to mitigate interference by receiving uplink radio signals, processing these for interference mitigation and transmitting the processed signals to the base station radio input (e.g. antenna input in FIG. 1).

Certain embodiments shown and described herein are suitable for multi-carrier communication protocols such as LTE or FDM or single-carrier FDMA.

Certain embodiments shown and described herein are suitable for a multiple-access scheme yielding a signal such that in each frame along a time-axis there are a number of mobile stations from different azimuthal directions distributed throughout the sector whereas the interference to be mitigated comes from a single direction.

An optional one-radio frame delay may be provided, downstream of the array of receiving elements.

An RF/IF (radio/intermediate frequency) to base-band down-converter may be provided which is operative to enable interference mitigation to be performed in baseband, along with a base-band to RF up-converter to convert the interference-mitigated signals back to RF/IF.

The present invention typically includes at least the following embodiments:

Embodiment 1

A system for cancelling interference in a wireless network, the system comprising:
apparatus for computing and outputting at least N weighting vectors; and apparatus for cancelling interference from antennae outputs received by the system using the weighting vectors respectively by converting the weighting vectors into FIR filter coefficients and applying FIR filters corresponding to the FIR filter coefficients to derivatives of antennae outputs received by the system.

Embodiment 2

A system for cancelling interference in a wireless network, the system comprising:
apparatus for computing and outputting N weighting vectors by estimating a spatial signature while distinguishing interference spatial signature from desired signal spatial signature although both are received simultaneously; and
apparatus for cancelling interference from N antennae outputs received by the system using the N weighting vectors respectively.

Embodiment 3

A system according to embodiment 1 wherein the apparatus for computing and outputting weighting vectors is operative by estimating a spatial signature while distinguishing interference spatial signature from desired signal spatial signature although both are received simultaneously.

Embodiment 4

A system according to any of embodiments 2, 3 wherein the estimating comprises computing a mean covariance matrix of the signal from all antennas.
}

Embodiment 5

A system according to embodiment 4 wherein the mean is taken over the time when the channel remains unchanged.

Embodiment 6

A system according to embodiment 5 wherein the mean is taken over at least a portion of a single cellular frame.

Embodiment 7

A system according to embodiment 5 or embodiment 6 wherein the mean comprises a weighted average.

Embodiment 8

A system according to embodiment 7 wherein the weighted average is computed using weights which change over time.

Embodiment 9

A system according to any of embodiments 4-8 and also comprising identifying anomalies with the spatial signature estimation over frequency pointing on a table desired signal over time.

Embodiment 10

A system according to embodiment 9 and also comprising performing spatial whitening.

Embodiment 11

A system according to embodiment 10 wherein the spatial whitening includes computing a weighting vector for each frequency.

Embodiment 12

A system according to embodiment 11 wherein the power of Rq in the computing is a programmable parameter.

Embodiment 13

A system according to any of embodiments 1-12 wherein at least one interference typically is at static location.

Embodiment 14

A system according to embodiment 2 wherein the apparatus for cancelling interference from N antennae outputs received by the system using the N weighting vectors respectively is operative for multiplying each frequency of each input antenna by a respective weight.

Embodiment 15

A system according to embodiment 1 wherein the converting the weighting vectors into FIR filter coefficients and applying FIR filters corresponding to the FIR filter coefficients to derivatives of antennae outputs received by the system comprises converting N weighting vectors corresponding in number to the number of antennae outputs into FIR filter coefficients and wherein the derivatives of antennae outputs comprises the antennae outputs themselves.

Embodiment 16

A system according to embodiment 1 wherein the apparatus for cancelling interference comprises separating each antenna output into frequency bands, applying a different FIR filter to each band, thereby to obtain frequency-band specific results, and summing the results to obtain a full-frequency output.

Embodiment 17

A system according to embodiment 6 wherein the mean is taken over a single subframe of a cellular frame.

Embodiment 18

A system according to embodiment 6 wherein the mean is taken over a single time-slot of a cellular frame.

Embodiment 19

A system according to embodiment 6 wherein the mean is taken over an entire single cellular frame.

Embodiment 20

A system according to any of embodiments 4-8 and wherein, if a spatial signature of an anomaly is identified which is not constant over different frequencies, the anomaly is not treated as interference.

Embodiment 21

A system according to any of the preceding embodiments and wherein the wireless network is operative in accordance with a multi-carrier protocol such as LTE.

Embodiment 22

A system according to any of the preceding embodiments and wherein the wireless network is operative in accordance with an HSPA protocol.

Embodiment 23

A system according to any of the preceding embodiments and wherein the wireless network is operative in accordance with a WiMAX protocol.

Embodiment 24

A system according to any of the preceding embodiments and wherein the wireless network is operative in accordance with a WiFi protocol.

Embodiment 25

A system according to any of the preceding embodiments and wherein the wireless network is operative in accordance with a WCDMA protocol.

Embodiment 26

A system according to any of the preceding embodiments and wherein the wireless network is operative in accordance with a GSM protocol.

Embodiment 27

A computer program product, comprising a non-transitory computer usable medium having a computer readable program code embodied therein, the computer readable program code adapted to be executed to implement a method according to any of the preceding embodiments.

Also provided is a computer program comprising computer program code means for performing any of the methods shown and described herein when the program is run on a computer; and a computer program product, comprising a typically non-transitory computer-usable or -readable medium or computer readable storage medium, typically tangible, having a computer readable program code embodied therein, the computer readable program code adapted to be executed to implement any or all of the methods shown and described herein. It is appreciated that any or all of the computational steps shown and described herein may be computer-implemented. The operations in accordance with the teachings herein may be performed by a computer specially constructed for the desired purposes or by a general purpose computer specially configured for the desired purpose by a computer program stored in a typically non-transitory computer readable storage medium.

Any suitable processor, display and input means may be used to process, display e.g. on a computer screen or other computer output device, store, and accept information such as information used by or generated by any of the methods and apparatus shown and described herein; the above processor, display and input means including computer programs, in accordance with some or all of the embodiments of the present invention. Any or all functionalities of the invention shown and described herein, such as but not limited to steps of flowcharts, may be performed by a conventional personal computer processor, workstation or other programmable device or computer or electronic computing device or processor, either general-purpose or specifically constructed, used for processing; a computer display screen and/or printer and/or speaker for displaying; machine-readable memory such as optical disks, CDROMs, magnetic-optical discs or other discs; RAMs, ROMs, EPROMs, EEPROMs, magnetic or optical or other cards, for storing, and keyboard or mouse for accepting. The term "process" as used above is intended to include any type of computation or manipulation or transformation of data represented as physical, e.g. electronic, phenomena which may occur or reside e.g. within registers and/or memories of a computer or processor. The term processor includes a single processing unit or a plurality of distributed or remote such units.

The above devices may communicate via any conventional wired or wireless digital communication means, e.g. via a wired or cellular telephone network or a computer network such as the Internet.

The apparatus of the present invention may include, according to certain embodiments of the invention, machine readable memory containing or otherwise storing a program of instructions which, when executed by the machine, implements some or all of the apparatus, methods, features and functionalities of the invention shown and described herein. Alternatively or in addition, the apparatus of the present invention may include, according to certain embodiments of the invention, a program as above which may be written in any conventional programming language, and optionally a machine for executing the program such as but not limited to a general purpose computer which may optionally be configured or activated in accordance with the teachings of the present invention. Any of the teachings incorporated herein may where-ever suitable operate on signals representative of physical objects or substances.

The embodiments referred to above, and other embodiments, are described in detail in the next section.

Any trademark occurring in the text or drawings is the property of its owner and occurs herein merely to explain or illustrate one example of how an embodiment of the invention may be implemented.

Unless specifically stated otherwise, as apparent from the following discussions, it is appreciated that throughout the specification discussions, utilizing terms such as, "processing", "computing", "estimating", "selecting", "ranking", "grading", "calculating", "determining", "generating", "reassessing", "classifying", "generating", "producing", "stereo-matching", "registering", "detecting", "associating", "superimposing", "obtaining" or the like, refer to the action and/or processes of a computer or computing system, or processor or similar electronic computing device, that manipulate and/or transform data represented as physical, such as electronic, quantities within the computing system's registers and/or memories, into other data similarly represented as physical quantities within the computing system's memories, registers or other such information storage, transmission or display devices. The term "computer" should be broadly construed to cover any kind of electronic device with data processing capabilities, including, by way of non-limiting example, personal computers, servers, computing system, communication devices, processors (e.g. digital signal processor (DSP), microcontrollers, field programmable gate array (FPGA), application specific integrated circuit (ASIC), etc.) and other electronic computing devices.

The present invention may be described, merely for clarity, in terms of terminology specific to particular programming languages, operating systems, browsers, system versions, individual products, and the like. It will be appreciated that this terminology is intended to convey general principles of operation clearly and briefly, by way of example, and is not intended to limit the scope of the invention to any particular programming language, operating system, browser, system version, or individual product.

Elements separately listed herein need not be distinct components and alternatively may be the same structure.

Any suitable input device, such as but not limited to a sensor, may be used to generate or otherwise provide information received by the apparatus and methods shown and described herein. Any suitable output device or display may be used to display or output information generated by the apparatus and methods shown and described herein. Any suitable processor may be employed to compute or generate information as described herein e.g. by providing one or more modules in the processor to perform functionalities described herein. Any suitable computerized data storage e.g. computer memory may be used to store information received by or generated by the systems shown and described herein. Functionalities shown and described herein may be divided between a server computer and a plurality of client computers. These or any other computerized components shown and described herein may communicate between themselves via a suitable computer network.

BRIEF DESCRIPTION OF THE DRAWINGS

Certain embodiments of the present invention are illustrated in the following drawings:

FIG. 5b is a graph showing possible overlap of frequency responses of the BPFs of FIG. 5a.

Computational components described and illustrated herein can be implemented in various forms, for example, as hardware circuits such as but not limited to custom VLSI circuits or gate arrays or programmable hardware devices such as but not limited to FPGAs, or as software program code stored on at least one intangible computer readable medium and executable by at least one processor, or any suitable combination thereof. A specific functional component may be formed by one particular sequence of software code, or by a plurality of such, which collectively act or behave or act as described herein with reference to the functional component in question. For example, the component may be distributed over several code sequences such as but not limited to objects, procedures, functions, routines and programs and may originate from several computer files which typically operate synergistically.

Data can be stored on one or more intangible computer readable media stored at one or more different locations, different network nodes or different storage devices at a single node or location.

It is appreciated that any computer data storage technology, including any type of storage or memory and any type of computer components and recording media that retain digital data used for computing for an interval of time, and any time of information retention technology, may be used to store the various data provided and employed herein. Suitable computer data storage or information retention apparatus may include apparatus which is primary, secondary, tertiary or off-line; which is of any type or level or amount or category of volatility, differentiation, mutability, accessibility, addressability, capacity, performance and energy use; and which is based on any suitable technologies such as semiconductor, magnetic, optical, paper and others.

DETAILED DESCRIPTION OF CERTAIN EMBODIMENTS

Figure 1:
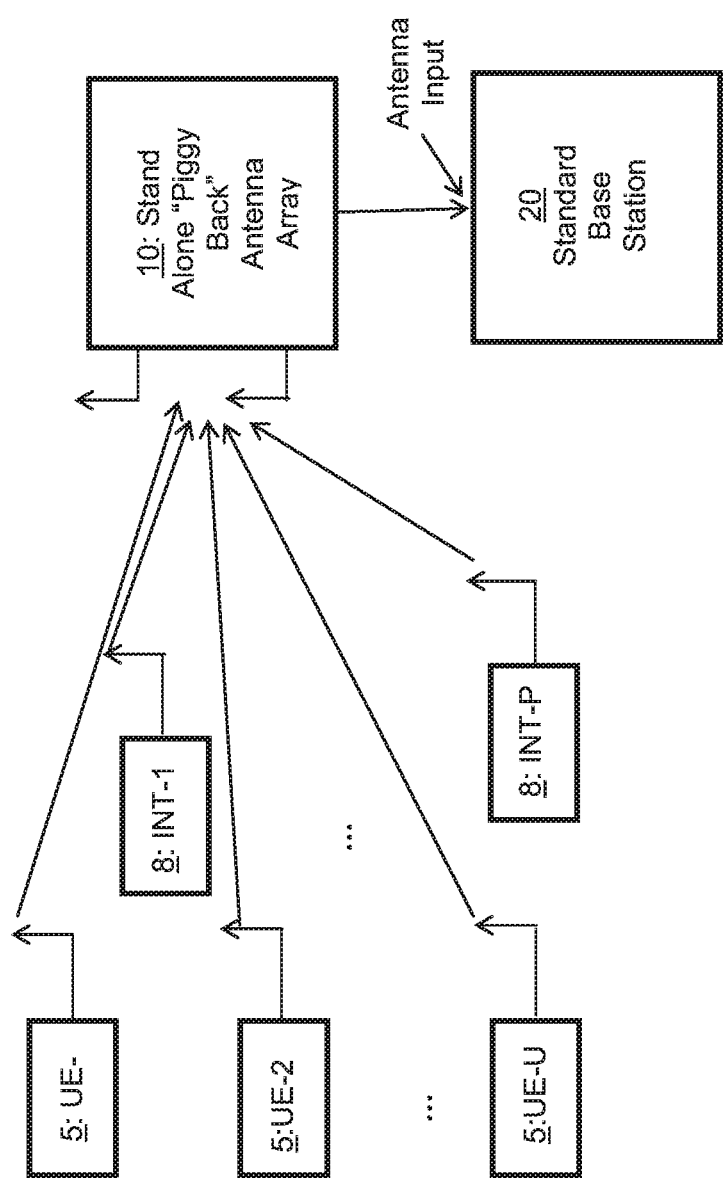
FIG. 1 is a simplified block diagram of an LTE uplink scenario with user equipment (UEs) and interferers (INTs), in which the interferers do not move, are active all the time and occupy the whole bandwidth.

FIG. 1 is a simplified block diagram of an LTE uplink scenario with U pieces of user equipment (UE) e.g. cellular telephones, smart phones or the like, and P interferers (INT). It may be assumed that the interferers do not move, are active all time and occupy the whole bandwidth. It is appreciated that the interferers may be moving slowly relative to the protocol time sections e.g. slots, subframes, frames.

It is desired to provide an antenna array operative to increase or maximize the signal to interferers and noise ratio (SINR). The antenna array may be of "piggy back" style, e.g., the antenna array may be autonomous, i.e. does not cooperate with the base station (BS). The only connection between them may be: the output of the antenna array may be connected to the antenna input of the BS.

Figure 6:
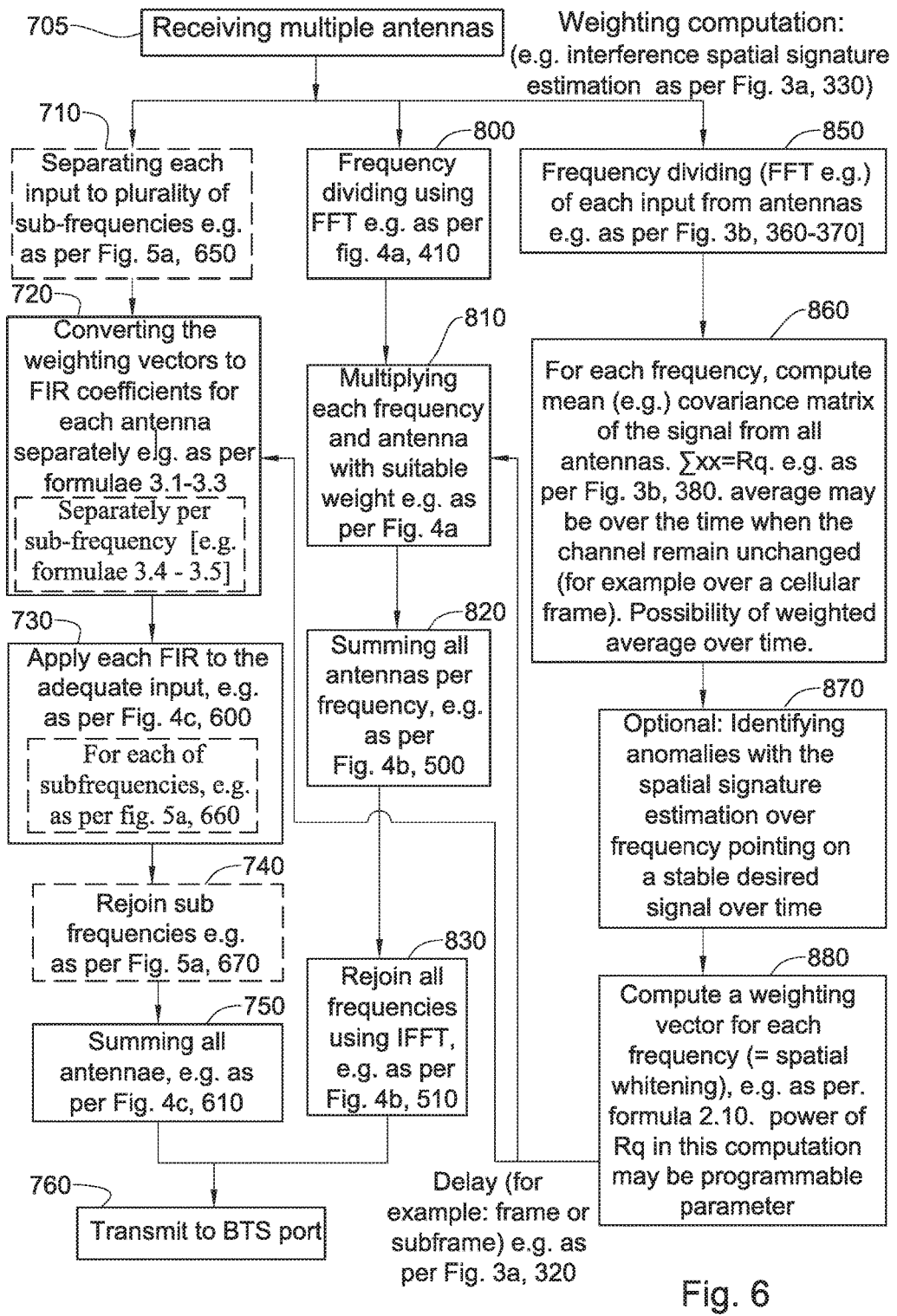
FIG. 6 is a simplified generally self-explanatory flowchart illustration of a method for spatial suppression of interferences e.g. in LTE-type cellular communication networks, according to an embodiment of the present invention.

A suitable spatial whitening method, suitable inter alia for implementing step 880 of FIG. 6, is now described in detail.

The signal seen at the antenna array at a given frequency, $f_k$, may be represented by the following formula:

$$x_l(f_k) = A_q q_l(f_k) + A_s s_l(f_k) v_l(f_k) + A_n n_l(f_k), l=1,2,\ldots, L, k=1,2,\ldots,K, \quad (2.1)$$

where q, v, n denote the spatial signature of interferers, signal and noise respectively. Each frequency may be considered separately such that the index $f_k$ is disregarded below. l may be discrete time that represents an increment of one symbol duration. The signal may be unknown, therefore may be considered noise, resulting in $$x_l = A_q q_l + \eta_l, l=1,2,\ldots,L, \quad (2.2)$$

where $\eta_l = A_s s_l v_l + A_n n_l$.

The interferers may be described by $$q_l = \sum_{p=1}^{P} z_l(p) h_p, \quad (2.3)$$

where: P denotes the number of interference sources. $z_l(p)$ may be spatially and temporally white noise, e.g., $$E\{z_{l_1}(p_1) z_{l_2}^*(p_2)\} = \begin{cases} 1, & l_1 = l_2 \text{ and } p_1 = p_2 \\ 0, & \text{otherwise} \end{cases}. \quad (2.4)$$

$h_p$ may be the spatial signature of the pth interference.

Estimation of a weighting vector is now described. Time averaging of the signal measured at the antenna array given by $$\frac{1}{L}\sum_{l=1}^{L} x_l x_l^H = \frac{1}{L}\sum_{l=1}^{L} q_l q_l^H + \frac{1}{L}\sum_{l=1}^{L} q_l \eta_l^H + \frac{1}{L}\sum_{l=1}^{L} \eta_l q_l^H + \frac{1}{L}\sum_{l=1}^{L} \eta_l \eta_l^H = \quad (2.5)$$

$$= \frac{1}{L}\sum_{l=1}^{L} q_l q_l^H + E_1(L) + E_2(L) + E_3(L)$$

may be the ML estimator of interferers' covariance matrix, $\hat{R}_q$. The operation represented by (2.5) may be performed for each frequency $f_k$ separately.

Consider the first term of (2.5)

$$\frac{1}{L}\sum_{l=1}^{L} q_l q_l^H = \frac{1}{L}\sum_{l=1}^{L}\left(\sum_{p=1}^{P} z_l(p)h_p\right)\left(\sum_{\lambda=1}^{P} z_l^*(\lambda)h_\lambda^H\right) = \quad (2.6)$$

$$\sum_{p=1}^{P}\sum_{\lambda=1}^{P} h_p h_\lambda^H \left(\frac{1}{L}\sum_{l=1}^{L} z_l(p)z_l^*(\lambda)\right) = \sum_{p=1}^{P}\sum_{\lambda=1}^{P} h_p h_\lambda^H e_{p,\lambda}(L)$$

It may be shown that $$\lim_{L\to\infty} E_1(L) = 0, \lim_{L\to\infty} E_2(L) = 0, \lim_{L\to\infty} E_3(L) = (A_s^2 + A_n^2)I_{N\times N},$$

$$\lim_{L\to\infty} e_{p,\lambda}(L) = \delta_{p,\lambda},$$

therefore from (2.5) and (2.6)

$$\frac{1}{L}\sum_{l=1}^{L} x_l x_l^H \approx \sum_{p=1}^{P} h_p h_p^H + (A_s^2 + A_n^2)I_{N\times N} = R_q + (A_s^2 + A_n^2)I_{N\times N} \quad (2.7)$$

where $$R_q = \sum_{p=1}^{P} h_p h_p^H \quad (2.8)$$

may be the exact value of the covariance matrix.
From (2.7):

$$\hat{R}_q = \frac{1}{L}\sum_{l=1}^{L} x_l x_l^H. \quad (2.9)$$

Having the estimation, $\hat{R}_q$, the weighting vector may be:

$$w = \hat{R}_q^{-\alpha} 1_N, \quad (2.10)$$

where $1_N$ is a column vector of size N with entries equal to one and $\alpha$ is a parameter that may be selected per application e.g. to suit one or more of the following application characteristics: scenario type, user types, interferers parameters (quantity, power, etc). When the covariance matrix is exactly known and $\alpha=1$, then maximum SINR may be obtained. However, in practice when the covariance matrix is estimated, different values for $\alpha$ may be considered.

In the presence of Doppler spread, the estimated covariance matrix may vary over time. Therefore, the covariance matrix estimation may be weighted, such that recent measurements are more dominant than earlier measurements. One suitable formula for this purpose is the following weighting:

$$\hat{R}_q(L) = \sum_{l=1}^{L} \lambda^{L-l} x_l x_l^H. \quad (2.11)$$

The value of $\lambda \leq 1$ may be determined according to the Doppler spread. If the Doppler spread is almost zero, then $\lambda$ may be chosen to be 1. If the Doppler spread is high, then $\lambda$ may be chosen to be smaller i.e. between 0 and 1.

Example: Consider this scenario:
Data from 1200 subcarriers and 10 msec (140 OFDM symbols).
Users exist at ALL the RB's. The spatial signatures of the user at each RB (Resource block) was randomly and independently determined
Two cases are considered merely by way of example:
1. Five interference sources with Ricean distribution and $K_{factor}=1$.
2. Three interference sources with Ricean distribution and $K_{factor}=1$.
Parameters of example scenario:
Array: Uniform circular array of 8 elements with radius 0.07 m. (Array radius chosen to enhance or optimize the gain and flatness of the array pattern).
Carrier frequency: 2.6 GHz (wavelength=0.1154 m)
Number of OFDM symbols per resource block: 14
Number of resource blocks used for computation of the spatial covariance matrix: 10 (10 msec)
Delay spread: 2 μsec
Spatial signatures of the users: Complex Gaussian (Rayleigh channel).
Spatial signature of the interferences: Ricean with K-factor=1 unless stated otherwise hereinbelow.
Number of paths per interference: 5 including LOS, unless stated otherwise hereinbelow.
Angular spread of the reflected paths from each interference source: 60°.

Each subcarrier may be processed separately. The spatial covariance matrix may be computed for each subcarrier using 140 OFDM symbols.

The pilot at each RB is typically not used in order to allow real time processing. Instead of the estimated spatial signature, a steering vector with one-elements may be used. This weight vector provides almost flat and omni-directional pattern with relatively high gain. The estimated spatial signal covariance matrix may be used to estimate the signal applying the formula:

$$\hat{s}_l(f_k) = \frac{1_N^T \hat{R}_q^{-\alpha}(f_k) x_l(f_k)}{1_N^T \hat{R}_q^{-\alpha}(f_k) 1_N}. \quad (2.12)$$

where $\alpha$ is set to 1.

Figure 2A:
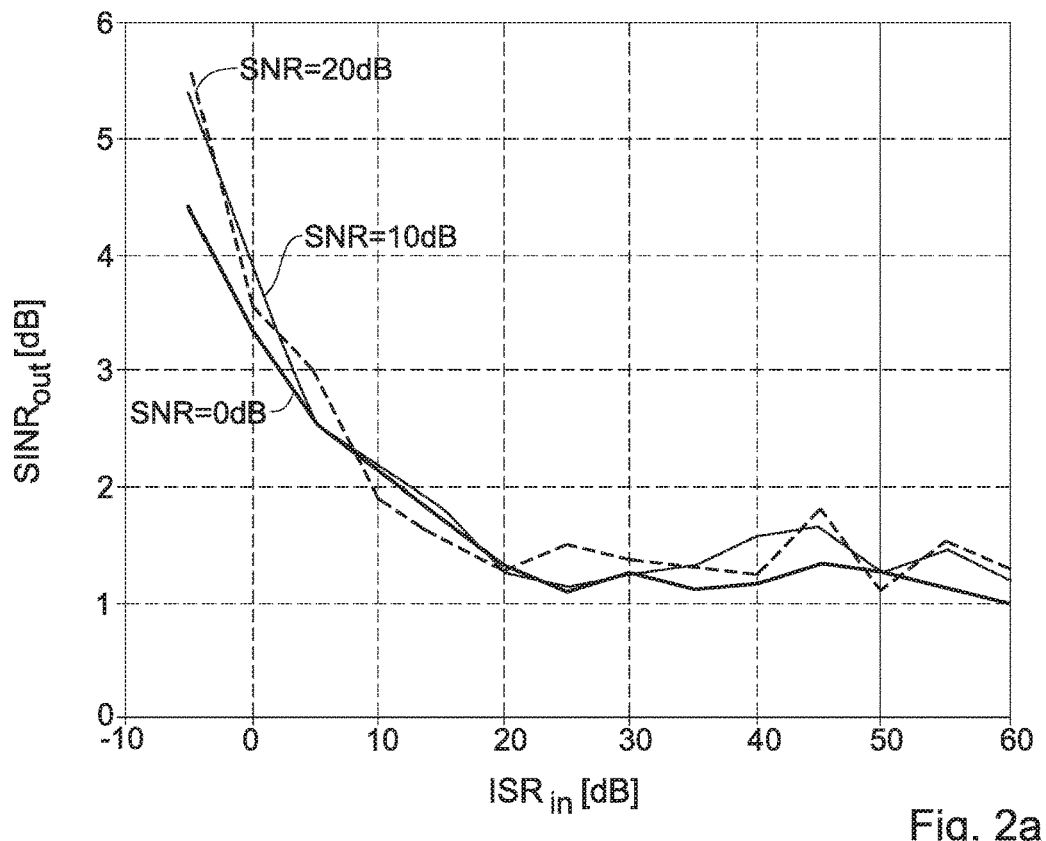
FIG. 2a is a graph of SINR at the output of the system vs. ISR (interference to signal ratio) at the input of the system, for five (by way of example) equal power interference sources and several (i.e. 3) SNRs (signal to noise ratios).
Figure 2B:
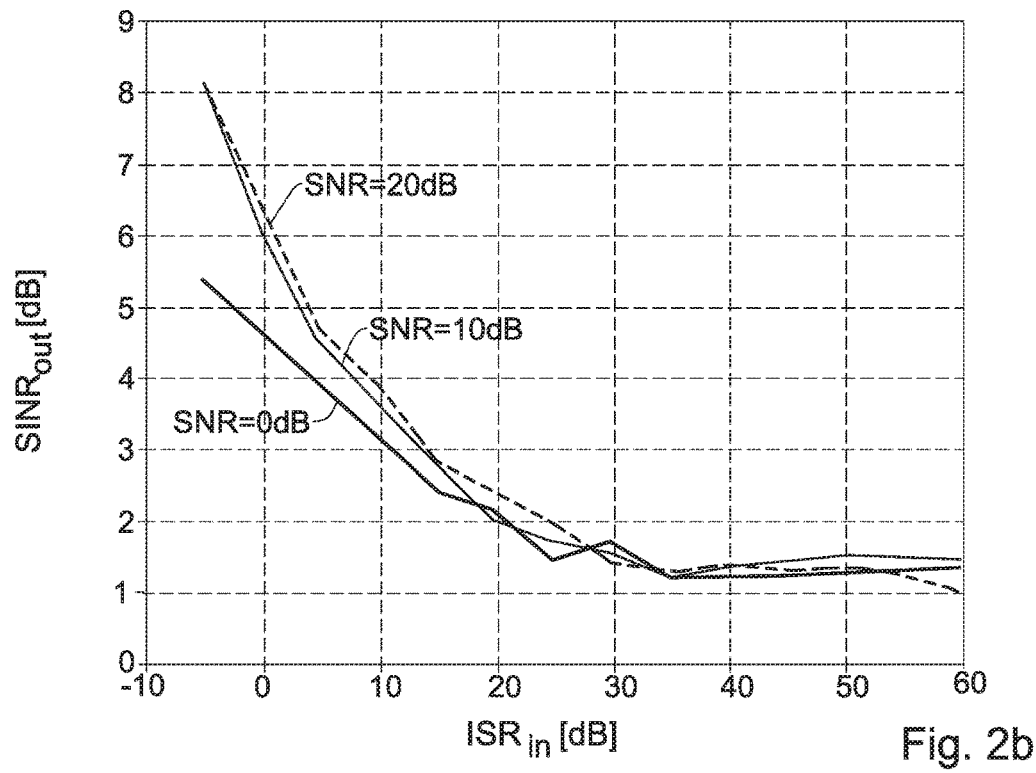
FIG. 2b is a graph is similar to FIG. 2a in which the five (by way of example) power interference sources are equally (by way of example) distributed between (by way of example) x and (x−20) dB.

The performance of the method shown and described herein, e.g. as per FIG. 6, was tested via simulations. The graph of FIG. 2a shows the SINR at the output of an interference cancellation system e.g. as shown and described herein, as a function of the input ISR at each one of the receiver elements, where the powers of all the interference sources are equal. The graph of FIG. 2b also shows SINR at the output of the system as a function of the input ISR at each one of the receiver elements. However, here the powers of all the interference sources are distributed such that the ISRs are respectively, as follows:
x dB, (x−5) dB, (x−10) dB, (x−15) dB, (x−20) dB, where x is the ISR indicated on the ISR axis.

Figure 3A:
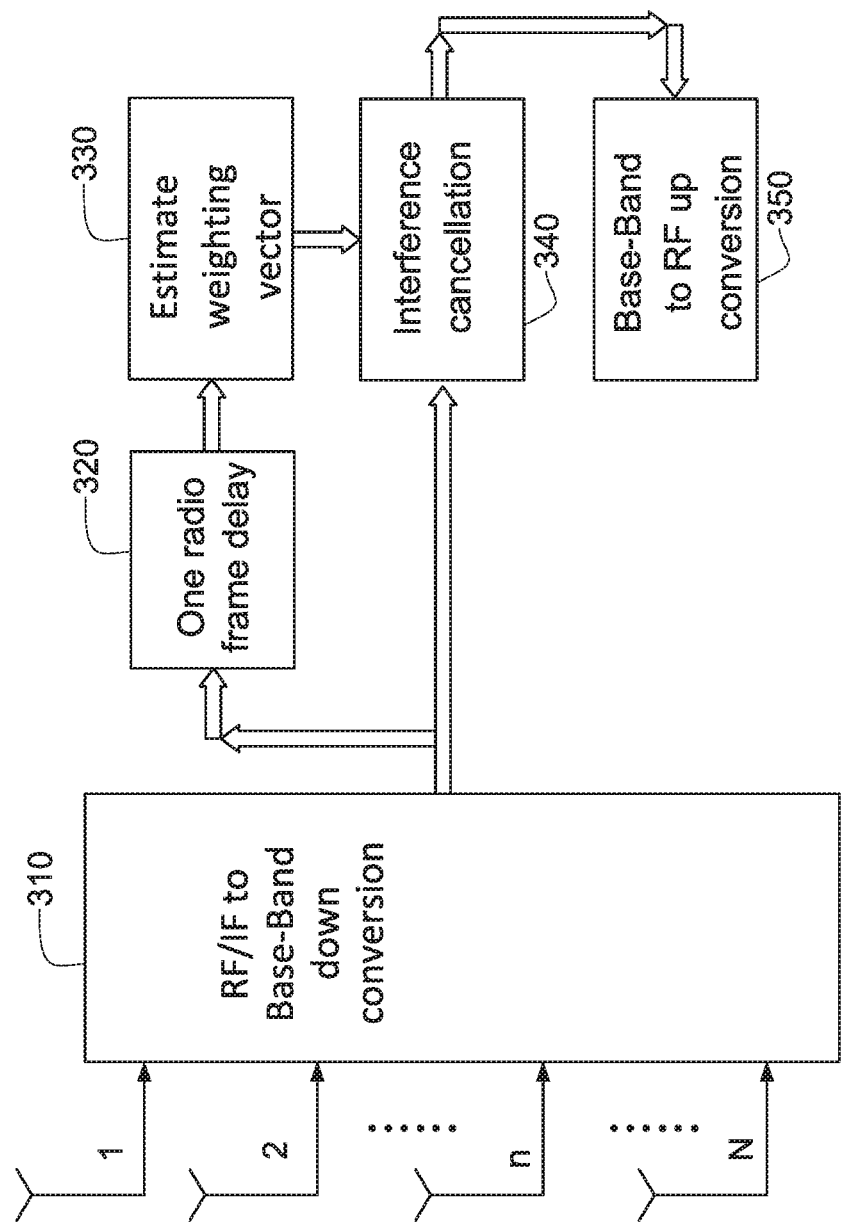
FIG. 3a shows a high level block diagram of an add-on system for spatial suppression of interferences e.g. in uplink of cellular communication networks, according to an embodiment of the present invention.

FIG. 3a shows a high level block diagram of a system for spatial suppression of interferences e.g. in LTE-type cellular communication networks, according to an embodiment of the present invention. It is appreciated that block 320 may be omitted, and/or blocks 310 and 350 may be omitted. A first suitable method for implementing the weighting vector estimation block 330 is described below with reference to steps 850-880 of FIG. 6. A second suitable method for implementing the weighting vector estimation block 330 is described below with reference to steps 850, 860 and 880 of FIG. 6.

A first suitable method for implementing the interference cancellation block 340 of FIG. 3a is described below with reference to steps 710-750 of FIG. 6, including sub-blocks marked with dashed lines. A second suitable method for implementing the interference cancellation block 340 is described below with reference to steps 720, 730 and 750 of FIG. 6, not including sub-blocks marked with dashed lines. A third suitable method for implementing the interference cancellation block 340 is described below with reference to steps 800-830 of FIG. 6.

The disclosure to this point has assumed that the spatial signatures of the useful signals averaged during radio frame influences the estimation of the covariance matrix like uncorrelated noise, yielding $$\lim_{L\to\infty} E_3(L) = (A_s^2 + A_n^2)I_{N\times N}.$$

However, the averaging process may be done for finite L, the number of OFDM symbols in radio frame. As a result, the spatial signature of relative strong user may influence the correlation matrix-like interference. Therefore this user may be partially cancelled/suppressed. In order to avoid this, the estimation of the covariance matrix, and then the computation of weighting vectors, may be performed during the (m−1)-th radio frame and may be used to cancel the interferences of m-th radio frame.

Figure 3B:
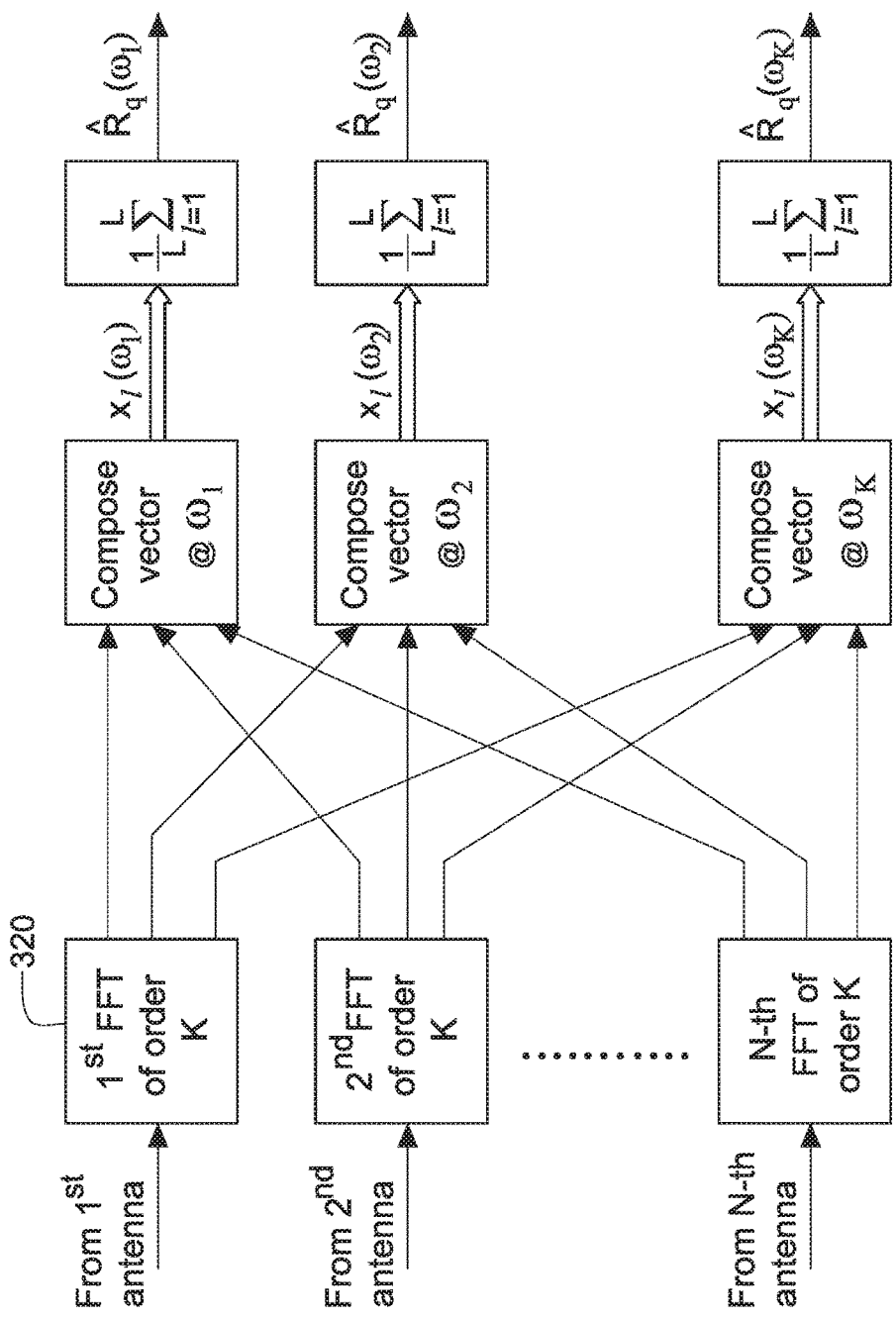
FIG. 3b is a simplified block diagram illustration of an apparatus for computation of average covariance matrices per frequency section (omega).

Notation:
k=1, 2, . . . , K indicate frequency indices of $\omega_k$ at which the weighting vector is estimated
$w_k$ is the weighting vector of the k-th frequency:
$w_k[w_k(1),w_k(2), \ldots ,w_k(N)]$
n=1, 2, . . . , N indicate antenna Computation of correlation matrices, e.g. for implementation of step 860 of FIG. 6, may be as illustrated in FIG. 3b. Having $\{\hat{R}_q(\omega_k)\}_{k=1}^K$ the weighting vectors may be computed e.g. according to (2.10).

Figure 4A:
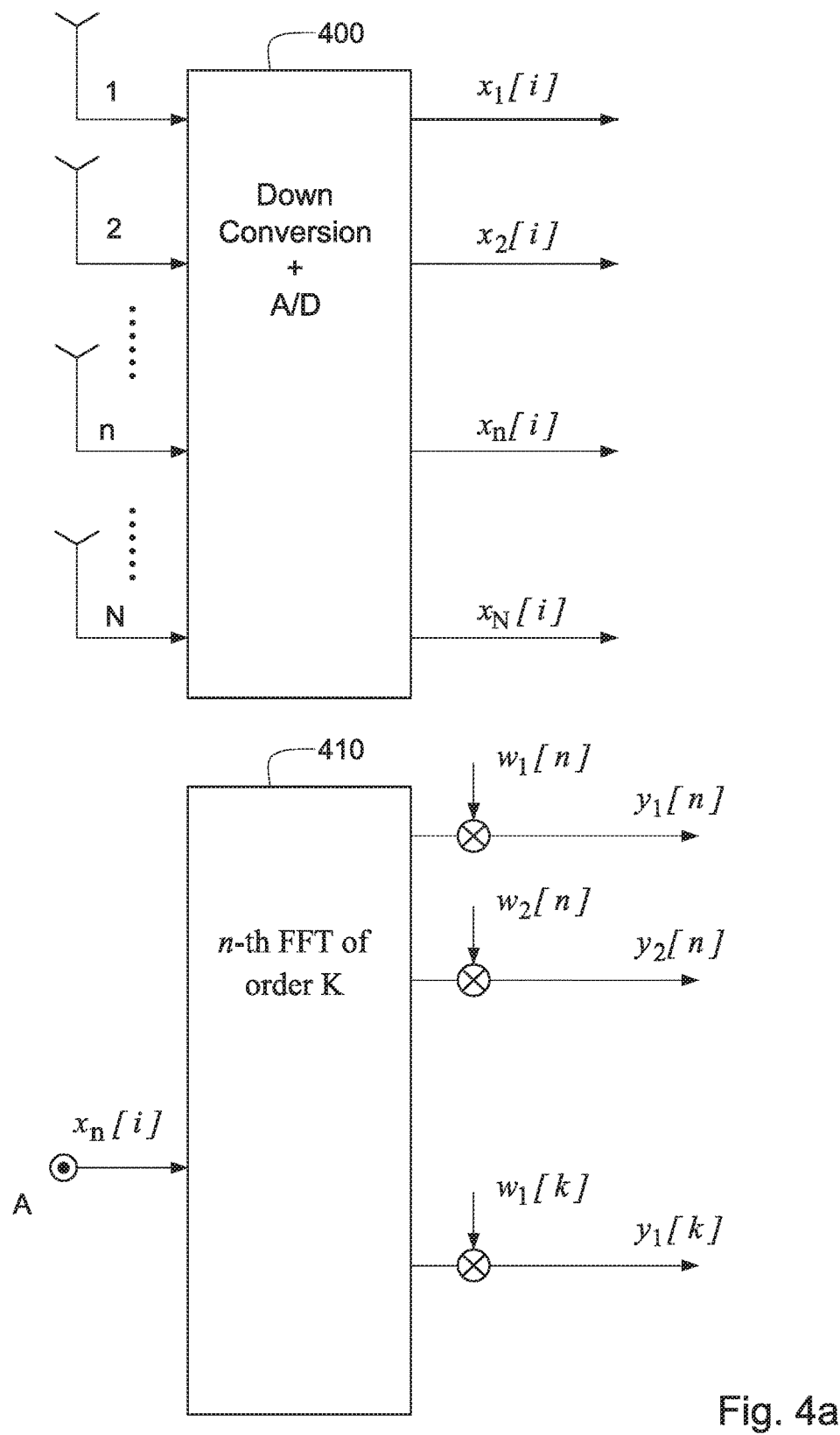
FIGS. 4a-4b, taken together, form a simplified block diagram illustration of the interference cancellation block of FIG. 3a, using FFT, according to a first embodiment.
Figure 4B:
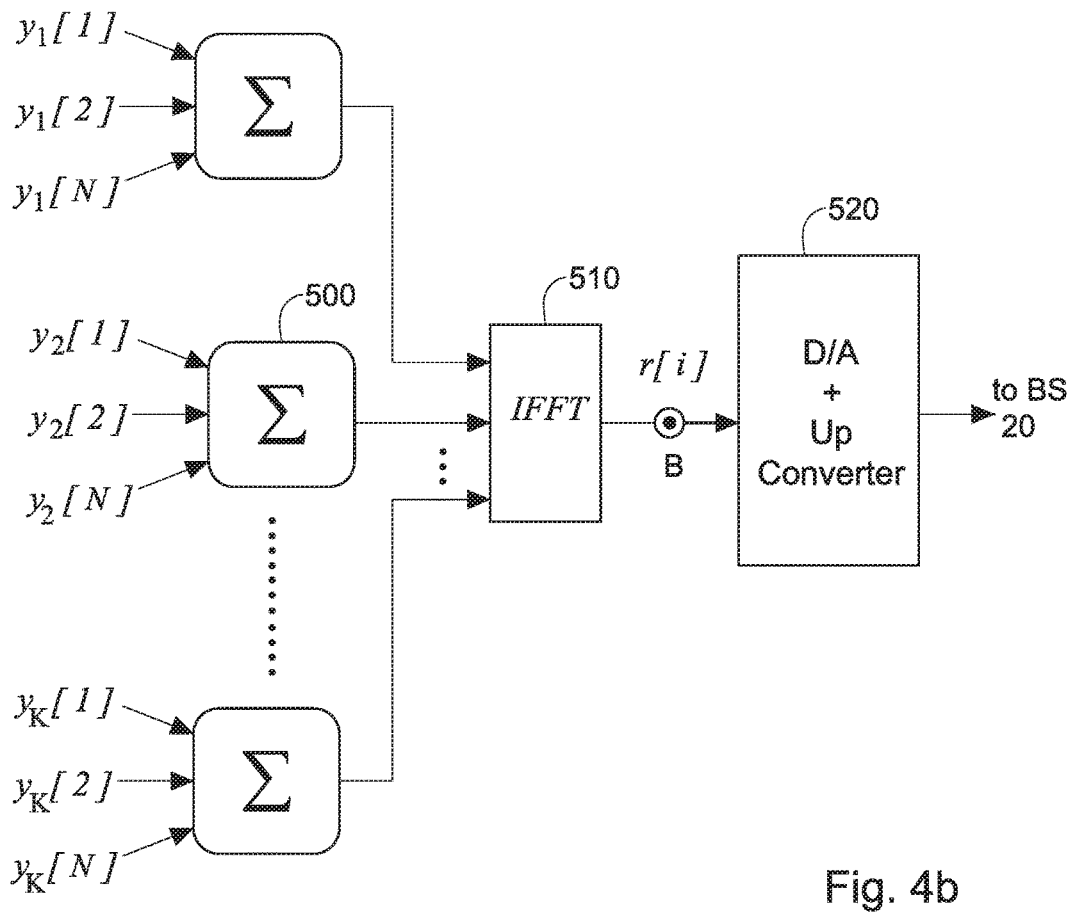
Figure 4C:
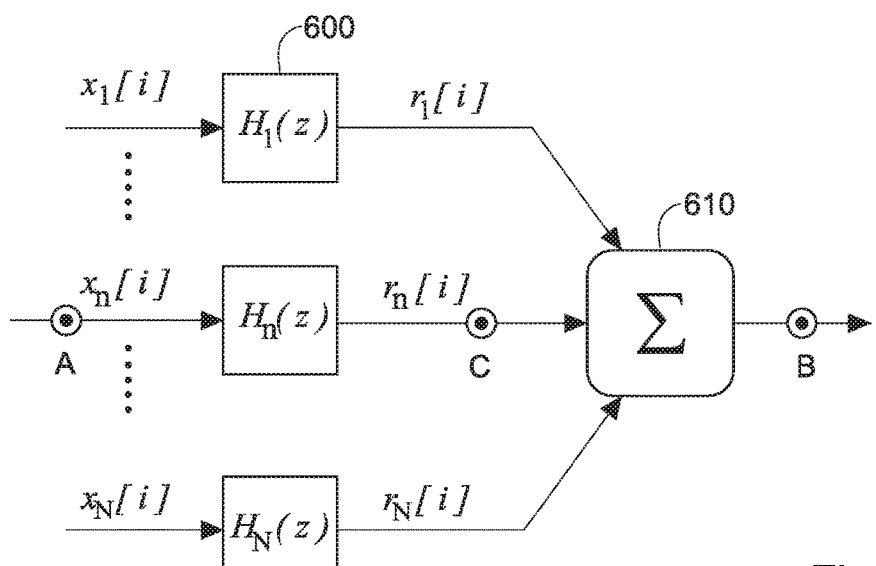
FIG. 4c is a simplified block diagram illustration of the interference cancellation block of FIG. 3a as a filter, according to a second embodiment.

A first implementation of the interference cancellation block 340 of FIG. 3a, using FFT, is illustrated in FIGS. 4a-4b, taken together. A second, filter, implementation of the interference cancellation block 340 of FIG. 3a, is illustrated in FIG. 4c.

The equivalent filter $H_n(z)$, connected to the n-th antenna, as a FIR filter, namely $$H_n(z) = \sum_{p=0}^{K-1} \alpha_p^{(n)} z^{-p}. \quad (3.1)$$

may have a frequency response which fulfills the following condition:

$$H_n(e^{j\omega k})=w_k(n), k=1,2, \ldots ,K, n=1,2, \ldots ,N \quad (3.2)$$

For each one of N antennas the coefficients $\alpha_p^{(n)}$ may be solutions of the following system of linear equations $$\sum_{p=0}^{K-1} \alpha_p^{(n)} e^{-jp\omega_k(n)} = w_k(n), k = 1, 2, \ldots , K. \quad (3.3)$$

The system (3.3) is typically solved on-line for each one of N antennas. System (3.3) may be rewritten thus, in matrix form:

$$E\alpha=w. \quad (3.3a)$$

Figure 5A:
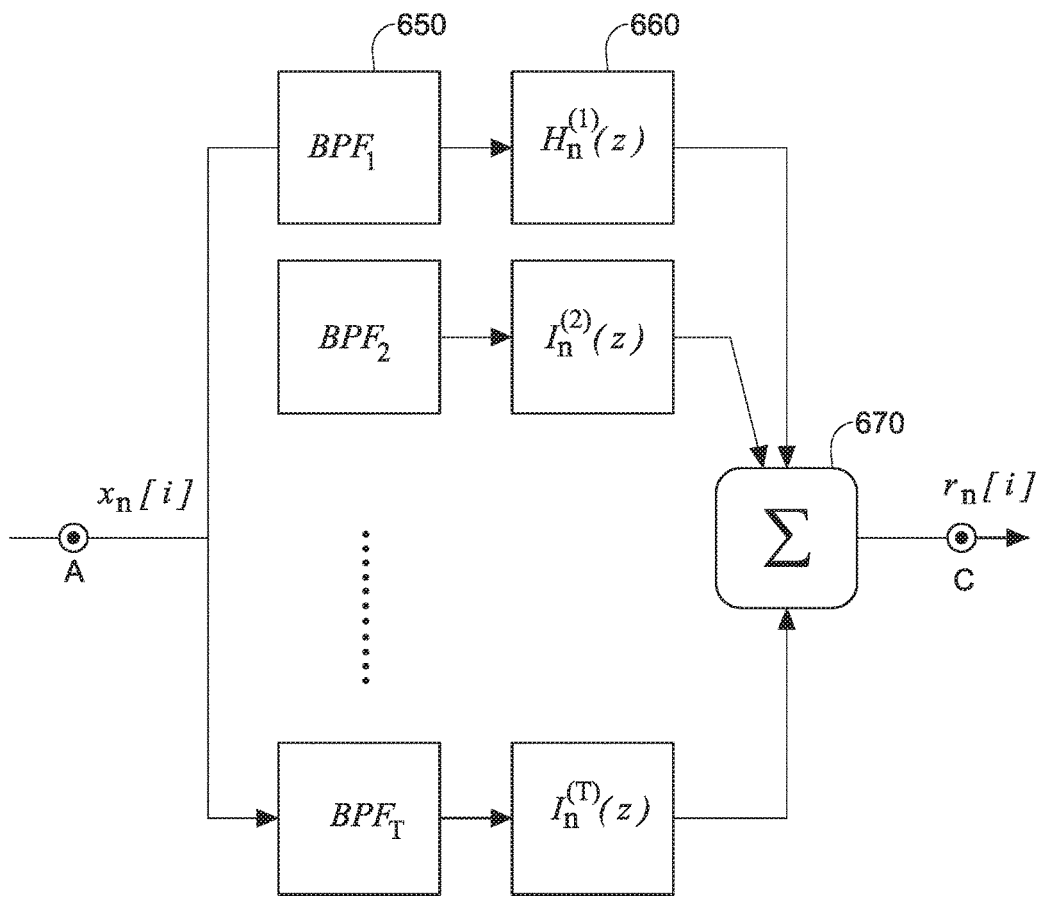
FIG. 5a is a simplified block diagram illustration of an embodiment in a bank of T BPFs (band pass filters) with fixed transfer function. To each of T BPFs a FIR filter may be connected, the value of T being selected to cause V to be sufficiently small for on-line "tuning" of the relevant FIR filter.

The size of E may be K×K. For large K e.g. K=2048, in certain use-cases and applications, it may be impractical to solve (3.3) on-line. As an alternative, a bank of T BPFs (band pass filters) with fixed transfer function may be employed. The BPF may be the same, except the central frequency, for each one of N antennas. To each one of T BPFs a FIR filter may be connected, e.g. as shown in FIG. 5a, whose frequency response depends on the weighting vector. The length of each one of $H_n^{(t)}(z)$, t=1, 2, . . . , T FIR filters may be V≈K/T and, as a result, the size of matrix E may be V×V. The value of T may be chosen to guarantee V sufficiently small for on-line "tuning" of the relevant FIR filter and may for example be within the range of 1-1000.

The condition (3.2) may be rewritten as $$\sum_{t=1}^{T} H_{BPF_t}(e^{j\omega_k})H_n^{(t)}(e^{j\omega_k}) = w_k(n), \quad (3.4)$$

$$n = 1, 2, \ldots , N, k = 1, 2, \ldots , K.$$

Figure 5B:
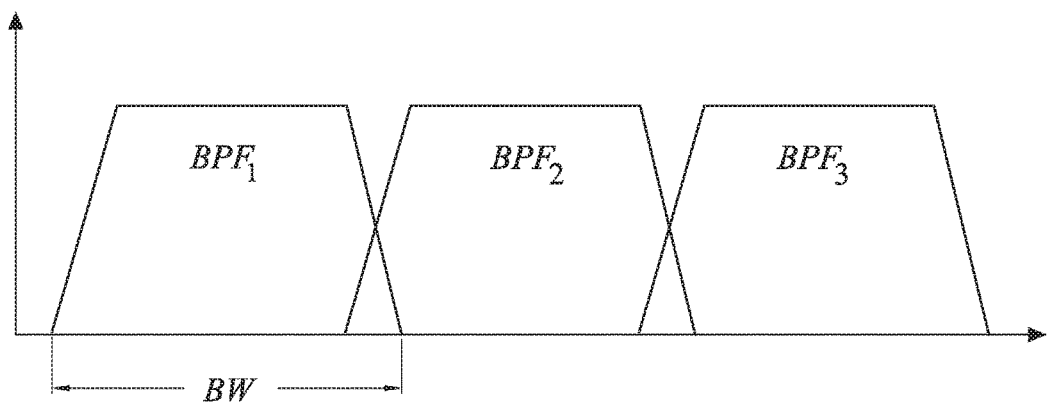

The frequency responses of BPFs may overlap, e.g. as shown in FIG. 5b.

Considering the case of FIG. 5b, the condition (3.4) has the following form $$\sum_{t=t_k-1}^{t_k+1} H_{BPF_t}(e^{j\omega_k})H_n^{(t)}(e^{j\omega_k}) = w_k(n), \quad (3.5)$$

$$n = 1, 2, \ldots , N, k = 1, 2, \ldots , K,$$

where $t_k$ depends on $\omega_k$. Moreover, in this case V=BW/Δω.

The filter, however implemented, may be considered as a part of a channel. It may be important to know how long its impulse response is. To estimate the impulse response, it may be assumed that the frequency domain correlation model of the physical channel is based on rectangular multipath, namely $$\rho(f)=\text{sinc}(2\pi f\tau_d), \quad (3.6)$$

where $\tau_d$ is multipath delay spread of the "real" channel. Due to this assumption, the duration of the impulse response may be approximated by the multipath delay spread, $\tau_d$.

FIG. 6 is a simplified flowchart illustration of a method for cancelling spatial interference which is constructed and operative in accordance with certain embodiments of the present invention and includes some or all of the illustrated steps, suitably illustrated e.g. as shown. As shown, signals from multiple antennae are received (step 705). Cancelling interference from antennae outputs received by the system may be effected, as shown in steps 710 to 750, using the weighting vectors respectively by converting the weighting vectors into FIR filter coefficients and applying FIR filters corresponding to the FIR filter coefficients to derivatives of antennae outputs received by the system. Any suitable weights may be employed, however, according to certain embodiments, weight computations proceed in accordance with the method of step 850 to step 880, with or without step 870.

It is appreciated that weight computations in accordance with step 850 to step 880 may also be employed for conventional interference cancellation similar to that shown in steps 800-830.

It is appreciated that optionally, the interference cancellation of steps 710 to 750 may include converting the weighting vectors into FIR filter coefficients and applying FIR filters corresponding to the FIR filter coefficients to derivatives of antennae outputs received by the system comprises converting N weighting vectors corresponding in number to the number of antennae outputs into FIR filter coefficients and wherein the derivatives of antennae outputs comprises the antennae outputs themselves. In this alternative, steps 710 and 740 and sub-steps indicated by dashed lines within steps 720 and 730, are omitted.

Alternatively however, cancelling interference comprises separating each antenna output into frequency bands, applying a different FIR filter to each band, thereby to obtain frequency-band specific results, and summing the results to obtain a full-frequency output. In this alternative, steps 710 and 740 and sub-steps indicated by dashed lines within steps 720 and 730, are performed.

It is appreciated that if desired signal is changing over time but interference is stable, the mean covariance estimates the spatial signature.

It is appreciated that the teachings shown and described herein may usefully be combined with the teachings of published PCT application WO2011158230 (publication of co-pending PCT application No. IL2011/000468 "System and Methods for Null Steering in a Multicarrier System"). The following teachings are known, e.g. from the above-referenced published PCT application WO2011158230:

1. A system for cancelling spatial interference associated with an original multi-carrier signal carrying at least one data transmission sent by a transmitter to an antenna array comprising a plurality of antennae and having a receiver operatively associated therewith, the system receiving a plurality of received signals respectively including the interference and the original signal as received by a respective individual antenna from among the plurality of antennae, the system comprising: a spatial nulling device for generating a cleaner signal by reducing at least one spatial component of the interference; and a signal manipulator operative to manipulate a derivative of the received signal so as to cause the at least one data transmission to be more concentrated in a subset of frequency bands in which the spatial nulling device is more effective and to be less concentrated in frequency bands which do not belong to the subset of frequency bands.

2. A system according to teaching 1 and also comprising an antenna array.

3. A system according to teaching 1 wherein the signal manipulator comprises a programmable band pass filter device which filters a signal to be filtered derived from a signal received by at least one of the antennae so as to pass at least one frequency band inside the subset and to block at least one frequency band outside the subset.

4. A system according to teaching 1 wherein the spatial nulling device includes a dynamic weighted antenna summation functionality operative to dynamically compute a weighted sum of signals received by the plurality of antennae wherein the weighting is performed in accordance with a plurality of weighting coefficients corresponding in number to the plurality of antennae and selected to reduce at least one spatial component of the received signal which includes interference.

5. A system according to teaching 3 wherein each the band pass filter has dynamically computed filter coefficients and wherein the signal manipulator also comprises a filter coefficient computer operative to dynamically compute the filter coefficients.

6. A system according to teaching 5 wherein the spatial nulling device includes a weighted antenna summation functionality operative to compute a weighted sum of signals received by the plurality of antennae wherein the weighting is performed in accordance with a plurality of weighting coefficients corresponding in number to the plurality of antennae, and wherein the filter coefficient computer is operative to use the plurality of weighting coefficients to dynamically compute the filter coefficients.

7. A system according to teaching 1 wherein the signal manipulator comprises an array of programmable band limited noise injectors including a plurality of programmable band limited noise injectors corresponding in number to the plurality of antennae, wherein each noise injector adds noise to the signal received from the antenna corresponding to the noise injector, such that noise is added only to frequency bands outside the subset and not to frequency bands inside the subset.

8. A system according to teaching 7 wherein the noise comprises white Gaussian noise.

9. A system according to teaching 1 wherein the signal manipulator comprises an array of programmable band pass filters including a plurality of band pass filters corresponding in number to the plurality of antennae and wherein each individual band pass filter filters the signal received from the antenna corresponding to the individual band pass filter so as to pass all frequency bands inside the subset and to block all frequency bands outside the subset.

10. A system according to teaching 1 wherein the signal manipulator receives information indicative of the cleaner signal and operates in accordance therewith.

11. A system according to teaching 10 wherein the information indicative of the cleaner signal comprises the cleaner signal itself.

12. A system according to teaching 10 wherein the information indicative of the cleaner signal comprises a result of spectral analysis performed on the cleaner signal.

13. A system according to teaching 10 wherein the signal manipulator determines the subset at least partly based on the information indicative of the cleaner signal.

14. A system according to teaching 4 wherein the signal manipulator determines the subset at least partly based on at least a portion of the plurality of weighting coefficients.

15. A system according to teaching 3 wherein the signal manipulator receives signals from the antenna array and feeds signal to the spatial nulling device and wherein the programmable band pass filter device comprises a plurality of band pass filters corresponding in number to the plurality of antennae and wherein the programmable band pass filter device comprises an array of programmable band pass filters including a plurality of band pass filters corresponding in number to the plurality of antennae and wherein each individual band pass filter filters the signal received from the antenna corresponding to the individual band pass filter so as to pass at least one frequency band inside the subset and to block at least one frequency band outside the subset.

16. A system according to teaching 3 wherein the spatial nulling device receives signals from the antenna array and feeds signal to the signal manipulator and wherein the signal to be filtered comprises an output signal generated by the spatial nulling device.

17. A system according to teaching 1 wherein the signal manipulator performs at least one frequency-dependent operation on the signal.

18. A system according to teaching 1 wherein the signal comprises a communication signal.

19. A system according to teaching 1 wherein the signal comprises a wideband signal.

20. In a multi-carrier communication system including a receiver, at least one transmitter transmitting a multi-carrier signal to the receiver, an interference canceller for cancelling spatial interference and a scheduler which is operative, for each individual time frame along a temporal axis, to allocate to various data transmissions, respective portions of a time-frequency region defined over the individual time frame, the multi-carrier signal defining a multiplicity of carriers together spanning a frequency band,
a method for adapting the interference canceller to the interference, the method comprising:
using the scheduler to reserve at least one empty sub-region within the time-frequency region by allocating only portions external to the sub-region to each of the data transmissions; and
configuring the interference canceller by deriving, from signal content in the empty sub-region, at least one interference-dependent parameter of the interference canceller's operation.

21. A method according to teaching 20 wherein the empty sub-region includes the entire frequency band and only a portion of the time frame.

22. A method according to teaching 20 wherein the empty sub-region includes only a portion of the frequency band and only a portion of the time frame.

23. A method according to teaching 20 wherein the empty sub-region includes only a portion of the frequency band and the entire the time frame.

24. A method according to teaching 20 wherein the using the scheduler to reserve at least one empty sub-region within the time-frequency region by allocating only portions external to the sub-region to each of the data transmissions comprises configuring the scheduler to reserve the at least one empty sub-region by allocating only the portions external to the sub-region to each of the data transmissions.

25. A method according to teaching 20 and wherein the using the scheduler comprises:
generating a request to the scheduler for allocation of a sub-region within the time-frequency region to an auxiliary transmitter;
employing the scheduler to accede to the request by allocating at least one individual sub-region to the auxiliary transmitter; and
refraining from transmitting within the individual sub-region.

26. A method according to teaching 25 wherein no auxiliary transmitter is provided and the request to the scheduler for allocation to an auxiliary transmitter comprises a simulated request.

27. A method according to teaching 25 wherein the receiver is located at a first location and wherein the method also comprises providing the auxiliary transmitter at a second location which differs from the first location.

28. A method according to teaching 25 wherein the method also comprises providing the auxiliary transmitter co-located with the receiver.

29. A method for cancelling spatial interference associated with an original multi-carrier signal carrying at least one data transmission sent by a transmitter to an antenna array comprising a plurality of antennae and having a receiver operatively associated therewith, the system receiving a plurality of received signals respectively including the interference and the original signal as received by a respective individual antenna from among the plurality of antennae, the system comprising: using a spatial nulling device for generating a cleaner signal by reducing at least one spatial component of the interference; and
manipulating a derivative of the received signal so as to cause the at least one data transmission to be more concentrated in a subset of frequency bands in which the spatial nulling device is more effective and to be less concentrated in frequency bands which do not belong to the subset of frequency bands.

30. A method according to teaching 29 and also comprising:
providing a scheduler which is operative, for each individual time frame along a temporal axis, to allocate to the at least one data transmission, at least one respective portion of a time-frequency region defined over the individual time frame; and
adapting the spatial nulling device to the interference, the adapting comprising:
using the scheduler to reserve at least one empty sub-region within the time-frequency region by allocating only at least one portion external to the sub-region to the at least one data transmission, rather than allocating any portion disposed internally of the sub-region to the at least one data transmission; and
configuring the spatial nulling device by deriving, from signal content in the empty sub-region, at least one interference-dependent parameter of the spatial nulling device's operation.

31. A method according to teaching 29 wherein the manipulating includes manipulating the received signal to cause the transmitter-receiver communications to be allocated only to a subset of frequency bands in which the spatial nulling device answers to a predetermined effectiveness criterion.

32. A method according to teaching 30 wherein the manipulating includes manipulating the received signal to cause the transmitter-receiver communications to be allocated only to a subset of frequency bands in which the spatial nulling device answers to a predetermined effectiveness criterion.

33. A method according to teaching 25, wherein the request to the scheduler is generated by the auxiliary transmitter.

34. A method according to teaching 20, wherein the multi-carrier communication system comprises a multi-user communication system.

35. A method according to teaching 20, wherein the configuring the interference canceller also comprises providing an empty region detector which triggers the interference canceller upon detection of the sub-region.

36. A system according to teaching 7 wherein each the noise injector has dynamically configurable noise parameters and wherein the signal manipulator also comprises a noise parameter computer operative to dynamically compute the noise parameters.

37. A system according to teaching 36 wherein the configurable noise parameters define frequency bands of the noise.

38. A system according to teaching 36 wherein the spatial nulling device includes a weighted antenna summation functionality operative to compute a weighted sum of signals received by the plurality of antennae wherein the weighting is performed in accordance with a plurality of weighting coefficients corresponding in number to the plurality of antennae, and wherein the noise parameters computer is operative to use the plurality of weighting coefficients to dynamically compute the noise parameters.

39. A method according to teaching 32 wherein the using the scheduler includes using the signal manipulator to manipulate the received signal so as to prevent the scheduler from allocating the empty sub-region to any of the data transmissions.

40. In a multi-carrier communication system including a receiver, at least one transmitter transmitting a multi-carrier signal to the receiver, an interference canceller for cancelling spatial interference and a scheduler which is operative, for each individual time frame along a temporal axis, to allocate to various data transmissions, respective portions of a time-frequency region defined over the individual time frame, the multi-carrier signal defining a multiplicity of carriers together spanning a frequency band;

apparatus for adapting the interference canceller to the interference, including:

apparatus for activating the scheduler to reserve at least one empty sub-region within the time-frequency region by allocating only portions external to the sub-region to each of the data transmissions; and apparatus for configuring the interference canceller by deriving, from signal content in the empty sub-region, at least one interference-dependent parameter of the interference canceller's operation.

41. A system according to teaching 18 wherein the communication signal comprises a multi-user communication signal.

42. A system according to teaching 1 wherein the subset of frequency bands in which the spatial nulling device is more effective comprises frequencies satisfying a predefined criterion based on at least the estimated reduction of the at least one spatial component of the received signal at the frequencies.

43. A system according to teaching 1 wherein the subset of frequency bands in which the spatial nulling device is more effective comprises frequencies satisfying a predefined criterion based on at least the estimated signal to interference ratio of the cleaner signal at the frequencies.

44. A method according to teaching 30 wherein the using the scheduler comprises configuring the scheduler to reserve the at least one empty sub-region by allocating only the portions external to the sub-region to each of the data transmissions.

45. A method according to teaching 30 wherein the using the scheduler comprises: generating a request to the scheduler for allocation of a sub-region within the time-frequency region to an auxiliary transmitter;

employing the scheduler to accede to the request by allocating at least one individual sub-region to the auxiliary transmitter; and refraining from transmitting within the individual sub-region.

46. A method according to teaching 45 wherein generating a request to the scheduler comprises generating the request by the auxiliary transmitter.

47. A system according to teaching 1 wherein the cleaner signal is cleaner than each of the plurality of received signals.

48. A system according to teaching 1 and also comprising a scheduler which is operative, for each individual time frame from among at least one time frame defined along a temporal axis, to allocate to the at least one data transmission, respective portions of a time-frequency region defined over the individual time frame; and to cause the at least one data transmission to be more concentrated in a subset of frequency bands by manipulating a derivative of the received signals so as to cause the scheduler to allocate the at least one data transmission such that the data transmission is more concentrated in a subset of frequency bands in which the spatial nulling device is more effective and is less concentrated in frequency bands which do not belong to the subset of frequency bands.

49. A system according to teaching 1 wherein the signal manipulator comprises a programmable band limited noise injector device which adds noise to a signal derived from a signal received by at least one of the antennae such that noise is added only to frequency bands outside the subset and not to frequency bands inside the subset.

50. A system according to teaching 49 wherein the spatial nulling device receives signals from the antenna array and feeds a signal to the signal manipulator, and wherein the signal derived from the signal received by the at least one of the antennae comprises an output signal generated by the spatial nulling device.

51. A method according to teaching 30 wherein the manipulating includes manipulating a derivative of the received signal so as to cause the scheduler to allocate the at least one data transmission such that the data transmission is more concentrated in a subset of frequency bands in which the spatial nulling device is more effective and is less concentrated in frequency bands which do not belong to the subset of frequency bands.

52. A method according to teaching 29 and also comprising: providing a scheduler which is operative, for each individual time frame from among at least one time frames defined along a temporal axis, to allocate to the at least one data transmission, respective portions of a time-frequency region defined over the individual time frame, and wherein the manipulating includes manipulating a derivative of the received signal so as to cause the scheduler to allocate the at least one data transmission such that the data transmission is more concentrated in a subset of frequency bands in which the spatial nulling device is more effective and is less concentrated in frequency bands which do not belong to the subset of frequency bands.

53. A method according to teaching 29 and also comprising: providing a scheduler which is operative, for each individual time frame along a temporal axis, to allocate to the at least one data transmission, at least one respective portion of a time-frequency region defined over the individual time frame; and adapting the spatial nulling device to the interference, the adapting comprising:

using the scheduler to reserve at least one empty sub-region within the time-frequency region by allocating only portions external to the sub-region to each of the data transmissions; and configuring the spatial nulling device by deriving, from signal content in the empty sub-region, at least one interference-dependent parameter of the spatial nulling device's operation.

One teaching is the addition of a signal manipulator block inside an architecture of an (e.g. conventional) spatial interference cancellation system which may include conventional spatial nulling apparatus such as FIG. 5a item 104 in the above-referenced PCT publication. This apparatus may include a weights computation block such as FIG. 2 item 146 in the above-referenced PCT publication and/or may include an interference cancellation execution block e.g., by way of example, multiplexing and summation functionalities 144 and 148 in the above-referenced PCT publication. According to certain embodiments of the present invention, the spatial nulling means of the above-referenced PCT publication may be in accordance with any of the systems and methods shown and described herein with reference to the drawings appended hereto.

It is appreciated that terminology such as "mandatory", "required", "need" and "must" refer to implementation choices made within the context of a particular implementation or application described herewithin for clarity and are not intended to be limiting since in an alternative implantation, the same elements might be defined as not mandatory and not required or might even be eliminated altogether.

It is appreciated that software components of the present invention including programs and data may, if desired, be implemented in ROM (read only memory) form including CD-ROMs, EPROMs and EEPROMs, or may be stored in any other suitable typically non-transitory computer-readable medium such as but not limited to disks of various kinds, cards of various kinds and RAMs. Components described herein as software may, alternatively, be implemented wholly or partly in hardware, if desired, using conventional techniques. Conversely, components described herein as hardware may, alternatively, be implemented wholly or partly in software, if desired, using conventional techniques.

Included in the scope of the present invention, inter alia, are electromagnetic signals carrying computer-readable instructions for performing any or all of the steps of any of the methods shown and described herein, in any suitable order; machine-readable instructions for performing any or all of the steps of any of the methods shown and described herein, in any suitable order; program storage devices readable by machine, tangibly embodying a program of instructions executable by the machine to perform any or all of the steps of any of the methods shown and described herein, in any suitable order; a computer program product comprising a computer useable medium having computer readable program code, such as executable code, having embodied therein, and/or including computer readable program code for performing, any or all of the steps of any of the methods shown and described herein, in any suitable order; any technical effects brought about by any or all of the steps of any of the methods shown and described herein, when performed in any suitable order; any suitable apparatus or device or combination of such, programmed to perform, alone or in combination, any or all of the steps of any of the methods shown and described herein, in any suitable order; electronic devices each including a processor and a cooperating input device and/or output device and operative to perform in software any steps shown and described herein; information storage devices or physical records, such as disks or hard drives, causing a computer or other device to be configured so as to carry out any or all of the steps of any of the methods shown and described herein, in any suitable order; a program pre-stored e.g. in memory or on an information network such as the Internet, before or after being downloaded, which embodies any or all of the steps of any of the methods shown and described herein, in any suitable order, and the method of uploading or downloading such, and a system including server/s and/or client/s for using such; and hardware which performs any or all of the steps of any of the methods shown and described herein, in any suitable order, either alone or in conjunction with software. Any computer-readable or machine-readable media described herein is intended to include non-transitory computer- or machine-readable media.

Any computations or other forms of analysis described herein may be performed by a suitable computerized method. Any step described herein may be computer-implemented. The invention shown and described herein may include (a) using a computerized method to identify a solution to any of the problems or for any of the objectives described herein, the solution optionally include at least one of a decision, an action, a product, a service or any other information described herein that impacts, in a positive manner, a problem or objectives described herein; and (b) outputting the solution.

The scope of the present invention is not limited to structures and functions specifically described herein and is also intended to include devices which have the capacity to yield a structure, or perform a function, described herein, such that even though users of the device may not use the capacity, they are if they so desire able to modify the device to obtain the structure or function.

Features of the present invention which are described in the context of separate embodiments may also be provided in combination in a single embodiment.

For example, a system embodiment is intended to include a corresponding process embodiment. Also, each system embodiment is intended to include a server-centered "view" or client centered "view", or "view" from any other node of the system, of the entire functionality of the system, computer-readable medium, apparatus, including only those functionalities performed at that server or client or node.

Conversely, features of the invention, including method steps, which are described for brevity in the context of a single embodiment or in a certain order may be provided separately or in any suitable subcombination or in a different order. "e.g." is used herein in the sense of a specific example which is not intended to be limiting. Devices, apparatus or systems shown coupled in any of the drawings may in fact be integrated into a single platform in certain embodiments or may be coupled via any appropriate wired or wireless coupling such as but not limited to optical fiber, Ethernet, Wireless LAN, HomePNA, power line communication, cell phone, PDA, Blackberry GPRS, Satellite including GPS, or other mobile delivery. It is appreciated that in the description and drawings shown and described herein, functionalities described or illustrated as systems and sub-units thereof can also be provided as methods and steps therewithin, and functionalities described or illustrated as methods and steps therewithin can also be provided as systems and sub-units thereof. The scale used to illustrate various elements in the drawings is merely exemplary and/or appropriate for clarity of presentation and is not intended to be limiting.

The invention claimed is:

1. A system for cancelling interference in a wireless network, the system comprising:
apparatus for computing and outputting at least N weighting vectors; and
apparatus for cancelling interference from antennae outputs received by the system using the weighting vectors respectively by converting the weighting vectors into FIR filter coefficients and applying FIR filters corresponding to the FIR filter coefficients to derivatives of antennae outputs received by the system,
the system being operative for identifying anomalies with the spatial signature estimation over frequency pointing on a stable desired signal over time.

2. A system according to claim 1, wherein said apparatus for computing and outputting weighting vectors is operative by estimating a spatial signature while distinguishing interference spatial signature from desired signal spatial signature although both are received simultaneously.

3. A system according to claim 1, wherein at least one interference typically is at static location.

4. A system according to claim 1, wherein said converting the weighting vectors into FIR filter coefficients and applying FIR filters corresponding to the FIR filter coefficients to derivatives of antennae outputs received by the system comprises converting N weighting vectors corresponding in number to the number of antennae outputs into FIR filter coefficients and wherein said derivatives of antennae outputs comprises the antennae outputs themselves.

5. A system according to claim 1, wherein said apparatus for cancelling interference comprises separating each antenna output into frequency bands, applying a different FIR filter to each band, thereby to obtain frequency-band specific results, and summing the results to obtain a full-frequency output.

6. A system according to claim 1, wherein said wireless network is operative in accordance with a multi-carrier protocol such as LTE.

7. A system according to claim 1, wherein said wireless network is operative in accordance with an HSPA protocol.

8. A system according to claim 1, wherein said wireless network is operative in accordance with a WiMAX protocol.

9. A system according to claim 1, wherein said wireless network is operative in accordance with a WiFi protocol.

10. A system according to claim 1, wherein said wireless network is operative in accordance with a WCDMA protocol.

11. A system according to claim 1, wherein said wireless network is operative in accordance with a GSM protocol.

12. A system according to claim 2, wherein said estimating comprises computing a mean covariance matrix of the signal from all antennas.

13. A method for cancelling interference in a wireless network, the method comprising:
    computing and outputting at least N weighting vectors; and
    cancelling interference from antennae outputs received by a system using the weighting vectors respectively by converting the weighting vectors into FIR filter coefficients and applying FIR filters corresponding to the FIR filter coefficients to derivatives of antennae outputs received by the system,
    wherein, if a spatial signature of a source is identified which is not constant over different frequencies, the source is not treated as interference.

14. A computer program product, comprising a non-transitory computer usable medium having a computer readable program code embodied therein, said computer readable program code adapted to be executed to implement a method for cancelling interference in a wireless network, the method comprising:
    computing and outputting at least N weighting vectors; and
    cancelling interference from antennae outputs received by a system using the weighting vectors respectively by converting the weighting vectors into FIR filter coefficients and applying FIR filters corresponding to the FIR filter coefficients to derivatives of antennae outputs received by the system,
    wherein said cancelling interference causes a delay and is configured to ensure that said delay is small enough to prevent at least one base station from erroneously concluding that the mobile stations are further away than the mobile stations are in fact.

* * * * *